United States Patent [19]

Collins

[11] 3,963,178

[45] June 15, 1976

[54] SPRAYER NOZZLE

[75] Inventor: Dean E. Collins, Lowell, Mich.

[73] Assignee: Root-Lowell Manufacturing Co., Lowell, Mich.

[22] Filed: Sept. 8, 1975

[21] Appl. No.: 611,222

[52] U.S. Cl. .......... 239/8; 239/77; 239/405; 239/417.3

[51] Int. Cl.$^2$ .......... A01N 17/08; B05B 7/10

[58] Field of Search .......... 239/77, 9, 432, 78, 239/8, 425.5, 426, 399, 468, 403, 405, 406, 416.5, 417.3, 424, 424.5; 222/193

[56] References Cited

UNITED STATES PATENTS

| | | | |
|---|---|---|---|
| 2,582,888 | 1/1952 | Schoenwetter | 239/405 |
| 2,603,280 | 7/1952 | Bernhard | 239/417.3 X |
| 2,668,082 | 2/1954 | Pasteur | 239/77 |
| 2,790,490 | 4/1957 | Smith | 239/406 |
| 3,493,180 | 2/1970 | Walsh | 239/406 |

*Primary Examiner*—Robert S. Ward, Jr.
*Attorney, Agent, or Firm*—Oltsch & Knoblock

[57] ABSTRACT

A nozzle which may be used with a low volume sprayer and which includes a plurality of spirally directed vanes positioned about a liquid inlet tube. Air is forced between the vanes creating a vortex which directs the liquid being expelled from the inlet tube against the vanes and then shears the liquid from the edges of the vanes in atomized form.

6 Claims, 7 Drawing Figures

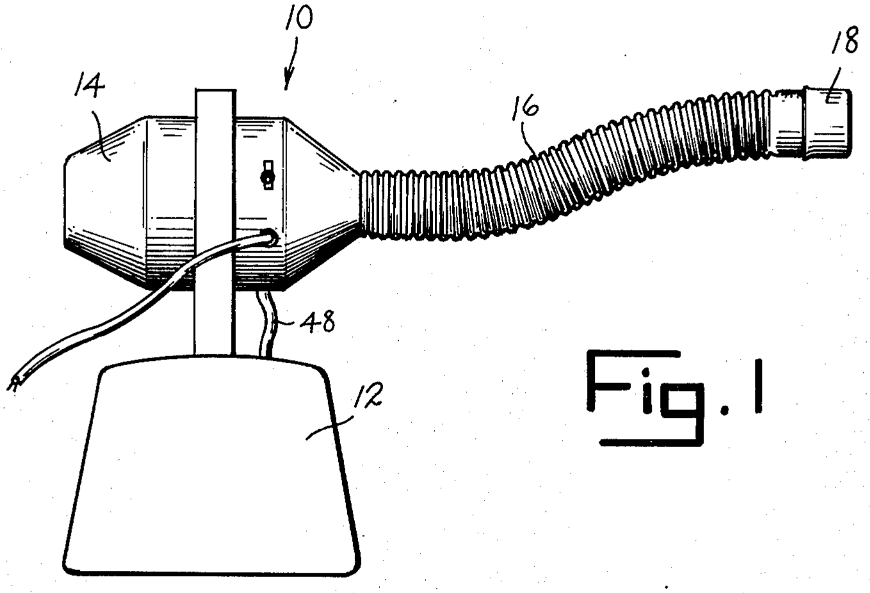
Fig. 1
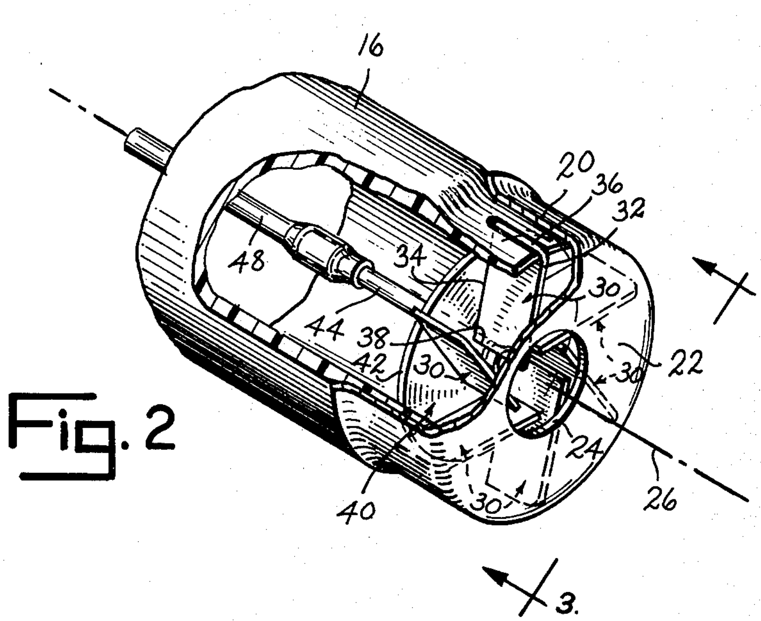
Fig. 2
Fig. 3
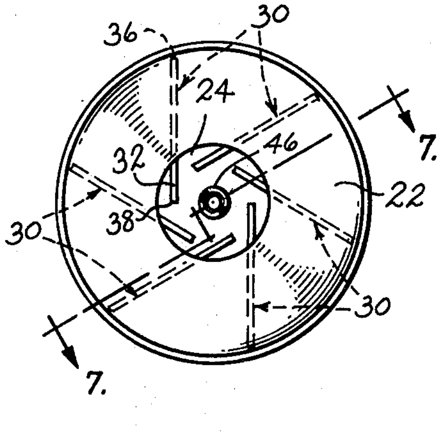

SPRAYER NOZZLE

SUMMARY OF THE INVENTION

This invention relates to a nozzle for a sprayer and will have specific application to a low volume sprayer, such as a fogger.

The nozzle of this invention will be used in combination with a sprayer liquid reservoir and a forced air flow source and includes a housing having an annular side wall and an end wall. A circular opening is formed in the housing end wall. A plurality of vane means are fitted within the nozzle housing adjacent its end wall so as to direct the air when introduced into the nozzle into a spiral or whirling direction within the housing. A liquid inlet tube is connected to the liquid reservoir and serves to introduce the spray liquid into the center of the vortex created by the whirling air flow within the nozzle housing. The liquid is carried by the air onto the vane means and is thereafter blown off the vane means and out of the opening in the housing end wall in atomized form. Through the nozzle of this invention spray liquid may be reduced to microfine particle sizes ranging from two to 50 microns for a forced air flow rate of approximately 60 cubic feet per minute.

Accordingly, it is an object of this invention to provide a sprayer having a nozzle for producing microfine liquid particles at low volume flow rates.

It is another object of this invention to provide an economical nozzle for a low volume sprayer which produces microfine spray particles.

Still another object of this invention is to provide a method of producing microfine liquid spray particles at low volume discharge rates.

Other objects of this invention will become apparent upon a reading of the invention's description.

BRIEF DESCRIPTION OF THE DRAWINGS

A preferred embodiment of this invention has been chosen for purposes of illustration and description wherein.

FIG. 1 is a perspective view of a sprayer incorporating the nozzle of this invention.

FIG. 2 is a fragmentary perspective view of the nozzle with portions of the connecting hose and nozzle housing broken away for purposes of illustration.

FIG. 3 is an end view of the nozzle when seen from line 3—3 of FIG. 2.

DESCRIPTION OF THE PREFERRED EMBODIMENT

Figure 4:
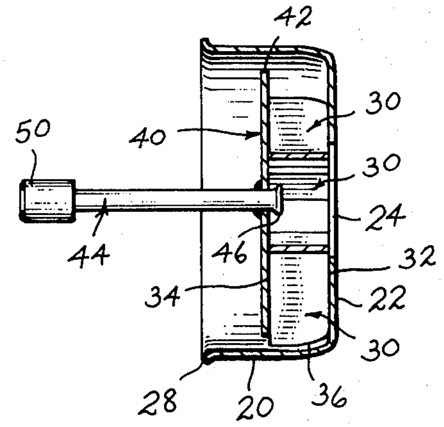
FIG. 4 is an isolated view of the nozzle shown in longitudinal sectional form.

The preferred embodiment illustrated is not intended to be exhaustive or to limit the invention to the precise form disclosed. It is chosen and described in order to best explain the principles of the invention and its application and practical use to thereby enable others skilled in the art to best utilize the invention.

Sprayer 10 shown in FIG. 1 includes a liquid receptacle 12 and a motorized blower 14. Blower 14 may be electrical or gasoline powered. A flexible hose 16 is connected to the outlet of blower 14. The sprayer 10 thus far described is of the common low volume type commonly used for producing a fog type spray. Mounted to the free end of hose 16 is nozzle 18 of this invention.

Nozzle 18 includes a housing defined by an annular side wall 20 formed equal radially about an axis 26 and an end wall 22. A center opening 24 is formed in housing wall 22. Opening 24 is concentric with axis 26 of the housing. If desired, the open edge 28 of the nozzle housing may be slightly flared to facilitate insertion of hose 16 into the housing. A plurality of vanes 30 are located within the housing. Each vane 30 includes an outer longitudinal edge 32, an inner longitudinal edge 34 which preferably parallels outer edge 32, an end edge 36 and an opposite end edge 38. Each vane 30 is positioned with its end edge 36 located adjacent the inside of housing side wall 20 and with its remaining end edge 38 located spacedly and an equal distance from housing axis 26. Outer longitudinal edge 32 of each vane 30 is positioned adjacent the inner surface of end wall 22 of the housing with a section of the vane projecting across a portion of end wall opening 24 to expose a part of edge 32 when viewing the nozzle from its front end as shown in FIG. 3. Vanes 30 are spirally directed about housing axis 26 with each vane having its end 38 offset from the radial line extending from axis 26 through end edge 36 of the vane.

Figure 5:
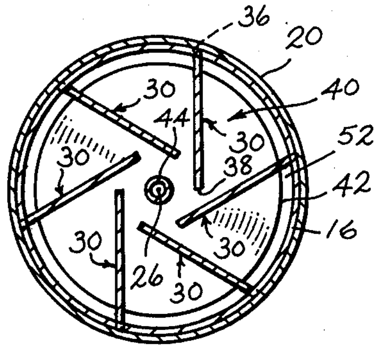
FIG. 5 is a sectional view taken along line 5—5 of FIG. 6.
Figure 6:
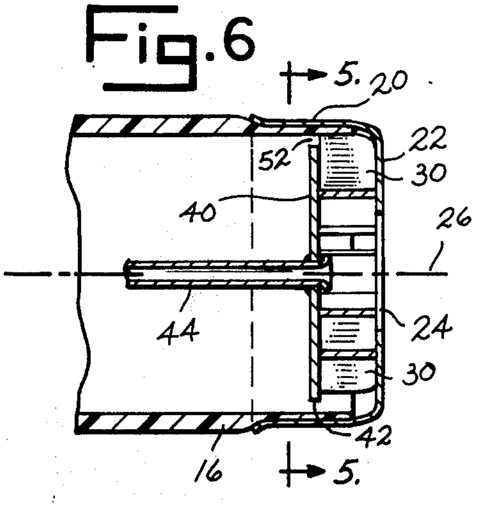
FIG. 6 is a fragmentary longitudinal sectional view of the nozzle shown mounted to the connecting hose of the sprayer.

A disk 40 overlies and is secured to the inner longitudinal edges 34 of vanes 30. Disk 40 is concentrically located relative to housing axis 26 and has an outer circular edge 42 inset from the inner surface of housing side wall 20 at all locations. A conduit 44 is fitted through a center opening in disk 40 and is aligned coaxially with housing axis 26. The discharge end 46 of conduit 44 projects slightly beyond disk 40 and is flared. The flexible tube 48 is connected at one end to the inlet end 50 of conduit 44. Tube 48 extends through the interior of hose 16 and passes through the housing for blower 14 down into liquid receptacle 12. Nozzle 18 is fitted onto the free end of hose 16 with side wall 20 of the housing constrictively engaging the side wall of hose 16 which is of reduced cross section. As best seen in FIGS. 5 and 6, a space exists between the outer circular edge 42 of disk 40 and hose 16 so as to provide an annular passage 52 by which the forced air from blower 14 passes from the hose around disk 40 and out opening 24 in housing end wall 22. An isolated view of nozzle 18 disconnected from sprayer 10 is shown in FIG. 4.

In an actual working embodiment of nozzle 18, the inside diameter of housing side wall 20 at disk 40 is approximately 50 mm. with the center opening 24 in end wall 22 having a diameter of approximately 19 mm. Disk 40 has a diameter of approximately 40 mm. and each vane 30 is approximately 23 mm. long and 9 mm. wide. Vanes 30, which are six in number, are positioned approximately sixty degrees apart. The internal diameter of liquid conduit 44 at its discharge end 46 is approximately 2½ mm., flaring to an outside diameter of approximately 4½ mm.

The flow rate of the spray liquid through conduit 44 and out nozzle 18 is between approximately 1 and 12 gallons per hour. A suitable valve (not shown) is associated with tube 48 and is utilized to vary the liquid flow rate through conduit 44. With the flow rate varied between 1 and 6 gallons per hour, the discharged liquid particle size will be generally between 9 and 10 microns. When the flow rate is varied between 6 and 12 gallons per hour, the discharged liquid particle size will be generally between 11 and 12 microns. The over-all range of particle size of the atomized spray liquid emitted from nozzle 18 will be between 2 and 50 microns.

Figure 7:
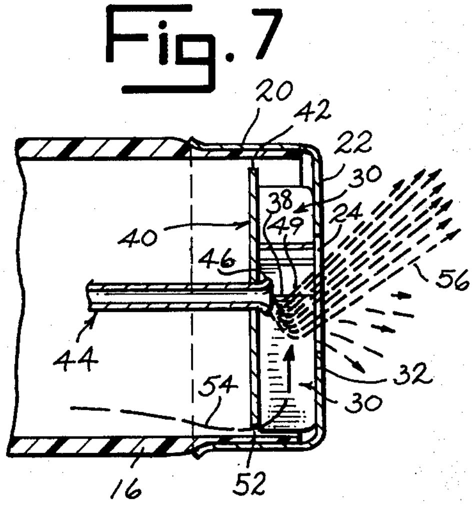
FIG. 7 is a fragmentary longitudinal sectional view taken along line 7—7 of FIg. 3 illustrating the liquid dispersion from the nozzle at a nozzle vane.

Nozzle 18 operates as follows. Blower 14 of sprayer 10 draws air from the surrounding atmosphere and forces it through hose 16 between 50 and 60 cubic feet per minute. The spray liquid within receptacle 12 is either pumped or drawn through tube 48 into conduit 44 of nozzle 18 in a manner well known in the art. The forced air illustrated by arrow 54 in FIG. 7 passes around outer edge 42 of disk 40 and through annular passage 52 where it then strikes vanes 30 and end wall 22 of the nozzle housing and is directed in a swirling or spiral fashion around discharge end 46 of conduit 44. This air vortex formed about the discharge end of conduit 44 serves to draw and shear the liquid 49 from the flared conduit discharge end. The sheared liquid is then carried by the swirling air onto the sides of vanes 30 where the liquid after contacting the vanes is spread over the vane sides and pushed toward the outer longitudinal edges 32 and end edges 38 of the vanes and sheared from these edges into microfine particle sized droplets 56.

In the manner above described, microfine particle sized sprays are obtained for low volume spraying of materials such as insecticides, disinfectants, germicides and deodorants in which small liquid particle size is needed to obtain coverage with small amounts of concentrated spray material.

It is to be understood that the invention is not to be limited to the details above given but may also be modified within the scope of the appended claims.

What I claim is:

1. A nozzle in combination with a sprayer having a liquid reservoir and a forced air flow source, said nozzle comprising a housing having an annular side wall formed by an axis and having an end wall, said end wall having a circular opening therein generally concentric with said housing axis, a plurality of vane means each having an outer longitudinal edge and an inner longitudinal edge extending between first and second end edges, said vane means having their first end edges positioned adjacent said side wall at generally equal angularly spaced locations about said housing axis, said vane means having their second end edges projecting partially across said end wall opening to expose portions of said vane means outer longitudinal edges, said vane means second end edges terminating at generally equal angularly spaced locations about said housing axis, each vane means second end edge being offset from a radial line extending between said housing axis and the first end edge of the vane means, a disk spaced from said end wall and overlying said vane means at their inner longitudinal edges, said disk having an outer circumferential edge spaced from said housing side wall and a center opening generally aligned with said housing axis, a liquid conduit means connected to said liquid reservoir and extending into said disk opening for directing spray liquid to said housing, an air hose means enclosing said conduit means and having one end engaging said housing side wall and another end associated with said air flow source for directing air into said housing with said air passing between said disk circumferential edge and housing side wall and along said vane means and out said housing end wall opening, said vane means for imparting a whirling motion to said air as it exits said housing end wall opening to cause liquid emitted from said conduit means to strike said vane means and be blown from the vane means at their second end edges and exposed portions of their outer longitudinal edges through said housing end wall opening in atomized form.

2. The nozzle and sprayer combination of claim 1 wherein said conduit means includes a flared end terminating adjacent said disk opening.

3. The nozzle and sprayer combination of claim 1 wherein each vane means outer longitudinal edge extends to adjacent said housing end wall.

4. The nozzle and sprayer combination of claim 3 wherein said vane means are six in number.

5. A method of atomizing a liquid entrained in air for use in low volume spraying, comprising the steps of:

a. introducing forced air between a plurality of angularly spaced vanes spirally directed in their longitudinal dimensions about an axis with said air being directed along the longitudinal dimension of each vane from one end edge to the other end edge of the vane, b. simultaneously introducing a liquid between said vanes at said axis with said air carrying said liquid onto said vanes, and c. further directing said air along the direction of said axis across said vanes to cause said liquid to be blown from the vanes in atomized form.

6. The method of claim 5 in which said air is introduced between said vanes at a flow rate between 50 and 60 cubic feet per minute.

* * * * *

REEXAMINATION CERTIFICATE (284th)

United States Patent [19] [11] B1 3,963,178

Collins [45] Certificate Issued Dec. 18, 1984

[54] SPRAYER NOZZLE

[75] Inventor: Dean E. Collins, Lowell, Mich.

[73] Assignee: Root-Lowell Manufacturing Co., Lowell, Mich.

Reexamination Request:
No. 90/000,501, Feb. 13, 1984

Reexamination Certificate for:

| | |
|---|---|
| Patent No.: | **3,963,178** |
| Issued: | **Jun. 15, 1976** |
| Appl. No.: | **611,222** |
| Filed: | **Sep. 8, 1975** |

[51] Int. Cl.[3] .................. B05B 7/10
[52] U.S. Cl. .................. 239/8; 239/77; 239/405; 239/417.3

[56] References Cited

U.S. PATENT DOCUMENTS

| | | |
|---|---|---|
| 1,901,806 | 3/1933 | Fulton . |
| 2,603,280 | 7/1952 | Bernhard . |
| 2,705,171 | 3/1955 | Ziherl . |
| 3,119,562 | 1/1964 | Tyler . |

*Primary Examiner*—John J. Love
*Attorney, Agent, or Firm*—Eugene C. Knoblock; James D. Hall; Thomas J. Dodd

[57] ABSTRACT

A nozzle which may be used with a low volume sprayer and which includes a plurality of spirally directed vanes positioned about a liquid inlet tube. Air is forced between the vanes creating a vortex which directs the liquid being expelled from the inlet tube against the vanes and then shears the liquid from the edges of the vanes in atomized form.

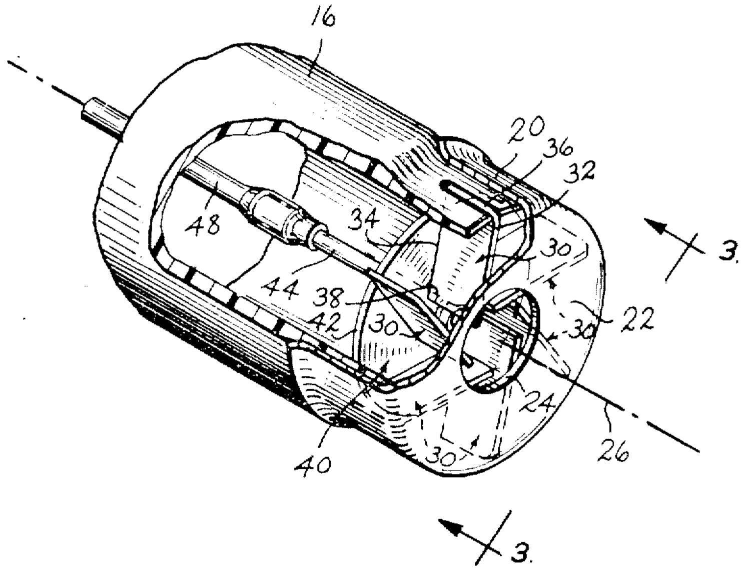

REEXAMINATION CERTIFICATE ISSUED UNDER 35 U.S.C. 307.

NO AMENDMENTS HAVE BEEN MADE TO THE PATENT.

AS A RESULT OF REEXAMINATION, IT HAS BEEN DETERMINED THAT:

The patentability of claims 1-6 is confirmed.

* * * * *